United States Patent
Yang et al.

(10) Patent No.: US 11,690,039 B2
(45) Date of Patent: Jun. 27, 2023

(54) WIRELESS COMMUNICATION METHOD OF DUAL-REGISTERED TERMINAL DEVICE, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 174 days.

(21) Appl. No.: 16/763,421

(22) PCT Filed: Nov. 24, 2017

(86) PCT No.: PCT/CN2017/112940
§ 371 (c)(1),
(2) Date: May 12, 2020

(87) PCT Pub. No.: WO2019/100339
PCT Pub. Date: May 31, 2019

(65) Prior Publication Data
US 2021/0368467 A1    Nov. 25, 2021

(51) Int. Cl.
*H04W 60/00* (2009.01)
*H04W 60/04* (2009.01)
*H04W 68/00* (2009.01)

(52) U.S. Cl.
CPC ......... *H04W 60/005* (2013.01); *H04W 60/04* (2013.01); *H04W 68/005* (2013.01)

(58) Field of Classification Search
CPC .. H04W 68/005; H04W 60/005; H04W 60/04
(Continued)

(56) References Cited

U.S. PATENT DOCUMENTS

2012/0190362 A1* 7/2012 Subbarayudu ........ H04W 76/28
455/435.1
2014/0086209 A1    3/2014 Su et al.
(Continued)

FOREIGN PATENT DOCUMENTS

CN      103348753 A    10/2013
WO    2017082780 A1     5/2017

OTHER PUBLICATIONS

3GPP TSG-RAN WG2 Meeting #99bis, R2-1711563 (Oct. 2017) (Year: 2017).*

(Continued)

*Primary Examiner* — William Nealon
(74) *Attorney, Agent, or Firm* — Young Basile Hanlon & MacFarlane, P.C.

(57) ABSTRACT

Implementations of the present disclosure provide a wireless communication method of a dual-registered terminal device, a terminal device, and a network device. The terminal device can reasonably transmit uplink information to a first network device and a second network device. The method comprises: the terminal device is registered in both a first network and a second network; the terminal device transmits a first message to the first network device, the first network device being a network device in the first network; the terminal device receives configuration information transmitted by the first network device, the configuration information indicating the terminal device to send an uplink message to the second network device within a first time period, and the second network device being a network device in the second network.

13 Claims, 5 Drawing Sheets

300  A first network device receives a first message transmitted by a terminal device, wherein the first network device is a network device in a first network — 310

The first network device transmits first indication information to a second network device, wherein the first indication information is used for indicating that the terminal device is not capable of currently transmitting an uplink message to the second network device, or the indication information is used for indicating a time when the terminal device transmits an uplink message to the second network device; wherein the second network device is a network device in a second network — 320

(58) Field of Classification Search
USPC .......................................................... 370/329
See application file for complete search history.

(56) References Cited

U.S. PATENT DOCUMENTS

2017/0290047 A1* 10/2017 Islam .................... H04W 72/14
2017/0347271 A1* 11/2017 Baldemair ........ H04W 72/1215

OTHER PUBLICATIONS

3GPP TSG-RAN WG2 Meeting #99bis, R2-1710156 (Oct. 2017) (Year: 2017).*
Indian Examiner Report for IN Application 202017024644 dated May 26, 2021. (6 pages).
3GPP TSG-RAN WG2 #100 Tdoc; Reno, Nevada, USA, Nov. 27-Dec. 1, 2017; R2-1713348.
3GPP TSG-RAN WG2 Meeting #100; Reno, USA, Nov. 27-Dec. 1, 2017; R2-1712995.
3GPP TSG-RAN WG2 Meeting #100; Reno, Nevada, USA, Nov. 27-Dec. 1, 2017; R2-1712688.
3GPP TSG-RAN WG2 Meeting #100; Reno, USA, Nov. 27-Dec. 1, 2017; R2-1712385.
Extended European Search Report for EP Application 17932604.6 dated Nov. 20, 2020.
3GPP TSG-RAN WG2 Meeting #100; Reno, USA, Nov. 27-Dec. 1, 2017; R2-1713878.
International Search Report dated Aug. 15, 2018 from PCT/CN2017/112940.
Communication pursuant to Article 94(3) EPC for EP Application 17932604.6 dated Feb. 17, 2023. (4 pages).

* cited by examiner

310 — A first network device receives a first message transmitted by a terminal device, wherein the first network device is a network device in a first network 320 — The first network device transmits first indication information to a second network device, wherein the first indication information is used for indicating that the terminal device is not capable of currently transmitting an uplink message to the second network device, or the indication information is used for indicating a time when the terminal device transmits an uplink message to the second network device; wherein the second network device is a network device in a second network

410 — A second network device receives indication information transmitted by a first device, wherein the indication information is used for indicating that a terminal device is not capable of currently transmitting an uplink message to the second network device, or the indication information is used for indicating a time when the terminal device transmits an uplink message to the second network device, wherein the second network device is a network device in a second network 420 — The second network device determines the time for receiving the uplink message transmitted by the terminal device according to the indication information

WIRELESS COMMUNICATION METHOD OF DUAL-REGISTERED TERMINAL DEVICE, TERMINAL DEVICE, AND NETWORK DEVICE

CROSS-REFERENCE TO RELATED APPLICATION(S)

This application is a 371 application of International Application No. PCT/CN2017/112940, filed on Nov. 24, 2017, the entire disclosure of which is hereby incorporated by reference.

TECHNICAL FIELD

The present disclosure relates to the field of communication, and more particularly to a method for wireless communication of a terminal device in dual-registration, a terminal device, and a network device.

BACKGROUND

In New Radio (NR) communication of the 5th-Generation (5G) mobile communication technology, a terminal device can support simultaneous reception (Rx) or Transmission (Tx) in two networks (e.g., Long Term Evolution (LTE) and NR), and the terminal device is registered in the two networks. For a terminal device that only supports single transmission (1Rx/1Tx), when uplink transmission is performed in one registration network, data cannot be transmitted in another registration network. How to realize uplink transmission in two registration networks is an urgent problem to be solved.

SUMMARY

Implementations of the present disclosure provide a method for wireless communication of a terminal device in dual-registration, a terminal device and a network device.

In a first aspect, an implementation of the present disclosure provides a method for wireless communication of a terminal device in dual-registration, wherein the terminal device is registered in a first network and a second network simultaneously.

The method includes: transmitting, by the terminal device, a first message to a first network device, wherein the first network device is a network device in the first network; and receiving, by the terminal device, configuration information transmitted by the first network device, wherein the configuration information is used for indicating the terminal device to transmit an uplink message to a second network device within a first time period, and the second network device is a network device in the second network.

In at least one implementation, in an implementation of the first aspect, before the terminal device transmits the first message to the first network device, or when the terminal device transmits the first message to the first network device, the method further includes: transmitting, by the terminal device, first indication information to the second network device, wherein the first indication information is used for indicating that the terminal device is not capable of currently transmitting an uplink message to the second network device, or the first indication information is used for indicating a time when the terminal device is capable of transmitting an uplink message to the second network device.

In at least one implementation, in an implementation of the first aspect, the first indication information includes a second time period, and the first indication information is used for indicating that the terminal device is not capable of transmitting an uplink message to the second network device within the second time period.

In at least one implementation, in an implementation of the first aspect, before the terminal device receives the configuration information transmitted by the first network device, the method further includes: transmitting, by the terminal device, second indication information to the first network device, wherein the second indication information is used for indicating that the terminal device needs to transmit at least one of uplink data, a paging response and a location update request to the second network device.

In at least one implementation, in an implementation of the first aspect, the first message includes at least one of uplink data, a paging response, and a location update request.

In at least one implementation, in an implementation of the first aspect, the method further includes: transmitting, by the terminal device, the uplink message to the second network device, wherein the uplink message includes at least one of uplink data, a paging response and a location update request.

In at least one implementation, in an implementation of the first aspect, the terminal device does not support simultaneous uplink transmission in the first network and the second network.

In at least one implementation, in an implementation of the first aspect, the first network is a Long Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

In a second aspect, an implementation of the present disclosure provides a method for wireless communication of a terminal device in dual-registration, wherein the terminal device is registered in a first network and a second network simultaneously.

The method includes: receiving, by a first network device, a first message transmitted by the terminal device wherein the first network device is a network device in the first network; and transmitting, by the first network device, first indication information to a second network device, wherein the first indication information is used for indicating that the terminal device is not capable of currently transmitting an uplink message to the second network device, or the first indication information is used for indicating a time when the terminal device transmits an uplink message to the second network device; wherein the second network device is a network device in the second network.

In at least one implementation, in an implementation of the second aspect, the method further includes: transmitting, by the first network device, configuration information to the terminal device, wherein the configuration information is used for indicating the terminal device to transmit an uplink message to the second network device within a first time period, and the second network device is a network device in the second network.

In at least one implementation, in an implementation of the second aspect, before the first network device receives the configuration information transmitted by the terminal device, the method further includes: receiving, by the first network device, indication information transmitted by the terminal device, wherein the indication information is used for indicating that the terminal device needs to transmit at least one of uplink data, a paging response, and a location update request to the second network device.

In at least one implementation, in an implementation of the second aspect, the method further includes: transmitting, by the first network device, second indication information to the terminal device, wherein the second indication information indicates the terminal device to transmit an uplink message to the second network device within a second time period.

In at least one implementation, in an implementation of the second aspect, the first message includes at least one of uplink data, a paging response, and a location update request.

In at least one implementation, in an implementation of the second aspect, the uplink message includes at least one of uplink data, a paging response, and a location update request.

In at least one implementation, in an implementation of the second aspect, the terminal device does not support simultaneous uplink transmission in the first network and the second network.

In at least one implementation, in an implementation of the second aspect, the first network is a Long Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

In a third aspect, an implementation of the present disclosure provides a method for wireless communication of a terminal device in dual-registration, wherein the terminal device is registered in a first network and a second network simultaneously.

The method includes: receiving, by a second network device, indication information transmitted by a first device, wherein the indication information is used for indicating that the terminal device is not capable of currently transmitting an uplink message to the second network device, or the indication information is used for indicating a time when the terminal device transmits an uplink message to the second network device, wherein the second network device is a network device in the second network; and determining, by the second network device, the time for receiving the uplink message transmitted by the terminal device according to the indication information.

In at least one implementation, in an implementation of the third aspect, before the second network device receives the indication information transmitted by the first device, the method further includes: transmitting, by the second network device, a paging message to the terminal device.

In at least one implementation, in an implementation of the third aspect, the method further includes: receiving, by the second network device, the uplink message transmitted by the terminal device.

In at least one implementation, in an implementation of the third aspect, the uplink message includes at least one of uplink data, a paging response and a location update request.

In at least one implementation, in an implementation of the third aspect, the first device is the terminal device or a first network device, and the first network device is a network device in a first network.

In at least one implementation, in an implementation of the third aspect, the terminal device does not support simultaneous uplink transmission in the first network and the second network.

In at least one implementation, in an implementation of the third aspect, the first network is a Long Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

In a fourth aspect, an implementation of the present disclosure provides a terminal device that may execute a module or unit of the method in the first aspect or any alternative implementation of the first aspect.

In a fifth aspect, an implementation of the present disclosure provides a network device that may execute a module or unit of the method in the second aspect or any alternative implementation of the second aspect.

In a sixth aspect, an implementation of the present disclosure provides a network device that may execute a module or unit of the method in the third aspect or any alternative implementation of the third aspect.

In a seventh aspect, a terminal device is provided. And the terminal device includes a processor, a memory, and a communication interface. The processor is connected with the memory and the communication interface. The memory is configured to store instructions, and the processor is configured to execute the instructions, and the communication interface is configured to communicate with other network elements under control of the processor. When the processor executes the instructions stored in the memory, the execution causes the processor to execute the method in the first aspect or any possible implementation of the first aspect.

In an eighth aspect, a network device is provided. And the network device includes a processor, a memory, and a communication interface. The processor is connected with the memory and the communication interface. The memory is configured to store instructions, and the processor is configured to execute the instructions, and the communication interface is configured to communicate with other network elements under control of the processor. When the processor executes the instructions stored in the memory, the execution causes the processor to execute the method in the second aspect or any possible implementation of the second aspect.

In a ninth aspect, a network device is provided. And the network device includes a processor, a memory, and a communication interface. The processor is connected with the memory and the communication interface. The memory is configured to store instructions, and the processor is configured to execute the instructions, and the communication interface is configured to communicate with other network elements under the control of the processor. When the processor executes the instructions stored in the memory, the execution causes the processor to execute the method in the third aspect or any possible implementation of the third aspect.

In a tenth aspect, a computer storage medium is provided, and the computer storage medium stores program codes used for instructing a computer to execute instructions of the methods described in the above various aspects.

In an eleventh aspect, a computer program product is provided. And the computer program product includes instructions, when executed on a computer, the instructions cause the computer to execute the methods described in the above various aspects.

DETAILED DESCRIPTION

Technical solutions in implementations of the present disclosure will be clearly and completely described below with reference to the drawings in the implementations of the present disclosure.

The technical solutions of the implementations of the present disclosure may be applied to various communication systems, such as a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, or a 5G NR communication system.

A terminal device in an implementation of the present disclosure may be referred to as a User Equipment (UE), an access terminal, a subscriber unit, a subscriber station, a mobile station, a mobile site, a remote station, a remote terminal, a mobile equipment, a user terminal, a terminal, a wireless communication equipment, a user agent or a user apparatus. An access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, an on-board device, a wearable device, a terminal device in a 5G network, or a terminal device in a future evolved Public Land Mobile Network (PLMN), etc., and implementations of the present disclosure are not limited thereto.

Various implementations are described herein in connection with network devices in the present disclosure. A network device in an implementation of the present disclosure may be a device for communicating with a terminal device. The access network device may be an Evolutional Node B (eNB or eNodeB) in an LTE system, or a radio controller in a Cloud Radio Access Network (CRAN). In at least one implementation, the access network device may be a relay station, an access point, an on-board device, a wearable device, a Next Generation Evolutional NodeB (NG-eNB), an access network device (such as a gNB) in a 5G network, or an access network device in a future evolved Public Land Mobile Network (PLMN). Implementations of the present disclosure are not limited thereto.

Figure 1:
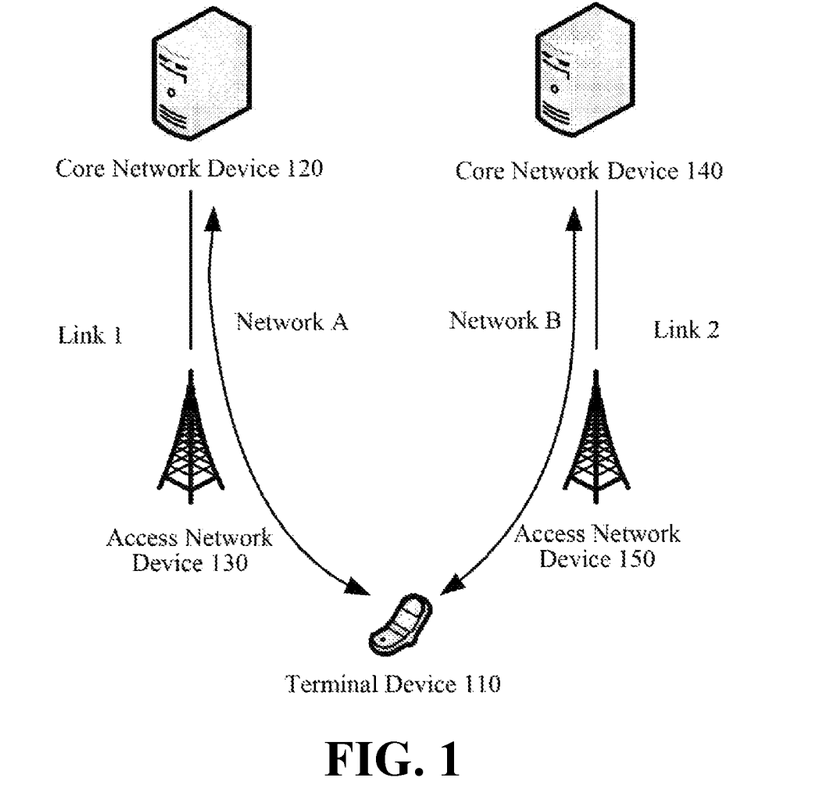
FIG. 1 is a schematic diagram of an application scenario according to an implementation of the present disclosure.

FIG. 1 is a schematic diagram of an application scenario of an implementation of the present disclosure. As shown in FIG. 1, a terminal device 110 in a wireless communication system 100 is registered in a network A through a link 1 and is registered in a network B through a link 2. The terminal device 110 is communicatively connected to a core network device 120 and an access network device 130 through the link 1, and the terminal device 110 is connected to a core network device 140 and an access network device 150 through the link 2. The core network device 120 is communicatively connected to the access network device 130, and the core network device 140 is communicatively connected to the access network device 150. The core network device 120 and the core network device 140 simultaneously serve the terminal device 110. Implementations of the present disclosure are not limited thereto.

In at least one implementation, the wireless communication system 100 may further include other network entities, and this is not limited in implementations of the present disclosure.

In at least one implementation, the network A is an LTE network, the network B is an NR network; or the network A is an NR network, the network B is an LTE network; or the network A is an NR network, the network B is an NR network; or the network A is an LTE network, the network B is an LTE network.

In at least one implementation, the core network device in the LTE network is a Mobility Management Entity (MME), and the access network device is an eNB. The core network device in the NR network is an Access and Mobility Management Function (AMF), and the access network device is a gNB.

In addition, various aspects or features of the present disclosure may be implemented as methods, apparatuses, or articles of manufacture using standard programming and/or engineering techniques. The term "article of manufacture" used in the present disclosure encompasses a computer program accessible from any computer-readable device, carrier, or medium. For example, the computer-readable medium may include, but not limited to, a magnetic storage device (such as a hard disk, a floppy disk, or a magnetic tape), a disk (such as a compact disc (CD), a digital versatile disc (Digital Versatile Disc, DVD)), smart cards and flash storage devices (such as Erasable Programmable Read-Only Storage (EPROM), cards, sticks or key drives). In addition, various storage mediums described herein may represent one or more devices and/or other machine-readable mediums for storing information. The term "machine-readable medium" may include, but is not limited to, various media capable of storing, containing, and/or carrying instructions and/or data.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
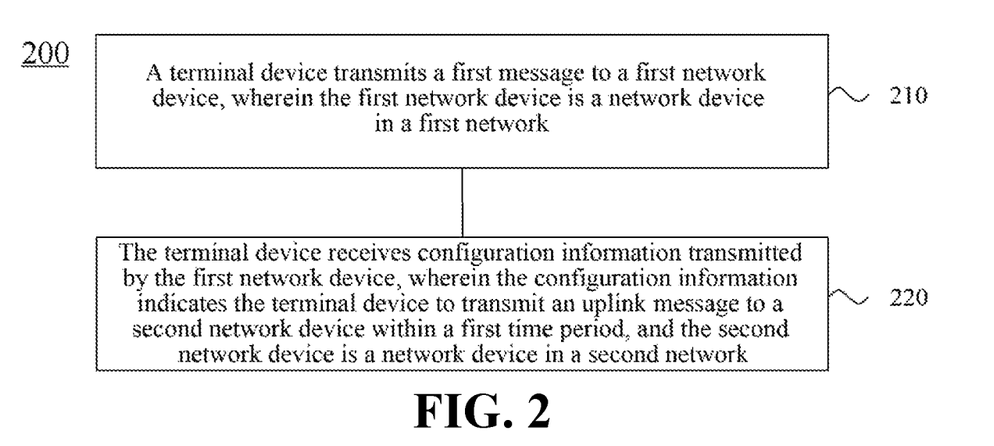
FIG. 2 is a schematic flow chart of a method for wireless communication of a terminal device in dual-registration according to an implementation of the present disclosure.

FIG. 2 is a schematic flow chart of a method 200 for wireless communication of a terminal device in dual-registration according to an implementation of the present disclosure. As shown in FIG. 2, the method 200 may be executed by a terminal device. The terminal device may be a terminal device as shown in FIG. 1, and the terminal device may be simultaneously registered in a first network and a second network. The method 200 includes following contents.

In 210, the terminal device transmits a first message to a first network device, wherein the first network device is a network device in the first network.

In at least one implementation, the terminal device does not support simultaneous uplink transmission in the first network and the second network.

For example, the terminal device only supports single transmission (1Tx, 2Rx/1Tx and 1Rx/1Tx).

In at least one implementation, the first message includes at least one of uplink data, a paging response, and a location update request.

In at least one implementation, the first network is an LTE network, the second network is an NR network; or the first network is an NR Network, the second network is an LTE network; or the first network is an NR network, the second network is an NR network; or the first network is an LTE network, the second network is an LTE network.

In at least one implementation, the first network device may be a core network device or an access network device. For example, the first network may be an LTE network, and the first network device may be an MME or an eNB.

In 220, the terminal device receives configuration information transmitted by the first network device, wherein the configuration information indicates the terminal device to transmit an uplink message to a second network device within a first time period, and the second network device is a network device in the second network.

In at least one implementation, the first time period may be defined through a Timer. When the timer expires, that means the first time period ends, and the terminal is not capable of transmitting an uplink message to the second network device but is capable of transmitting an uplink message to the first network device only.

In at least one implementation, the second network device may receive the uplink message transmitted by the terminal device in different time periods in a Discontinuous Reception (DRX) mode.

In at least one implementation, the uplink message includes at least one of uplink data, a paging response and a location update request.

In at least one implementation, the second network device may be a core network device or an access network device. For example, the second network may be an NR network, and the second network device may be an AMF or a gNB.

In at least one implementation, the first network device configures the first time period, so that the terminal device may notify the second network device of the time when the terminal device transmits uplink information to the second network device.

In at least one implementation, before the terminal device transmits the first message to the first network device, or when the terminal device transmits the first message to the first network device, the method 200 further includes: the terminal device transmits first indication information to the second network device, wherein the first indication information is used for indicating that the terminal device is not capable of currently transmitting an uplink message to the second network device, or the first indication information is used for indicating a time when the terminal device is capable of transmitting an uplink message to the second network device.

In at least one implementation, the first indication information includes a second time period, and the first indication information is used for indicating that the terminal device is not capable of transmitting an uplink message to the second network device within the second time period.

In at least one implementation, a time length of the second time period may be equal to or slightly greater than that of the first time period.

In at least one implementation, the terminal device may transmit uplink information to the second network device after completing the transmission of the first message.

In at least one implementation, before the terminal device receives the configuration information transmitted by the first network device, the method further includes: the terminal device transmits second indication information to the first network device, wherein the second indication information is used for indicating that the terminal device needs to transmit at least one of uplink data, a paging response and a location update request to the second network device.

In at least one implementation, the method further includes: the terminal device transmits an uplink message to the second network device.

Therefore, in the method for wireless communication of a terminal device in dual-registration according to the implementations of the present disclosure, a terminal device transmits uplink information to a second network device according to configuration information transmitted by a first network device, while transmitting a first message to the first network device, so that the terminal device can reasonably transmit uplink information to the first network device and the second network device.

Figure 3:
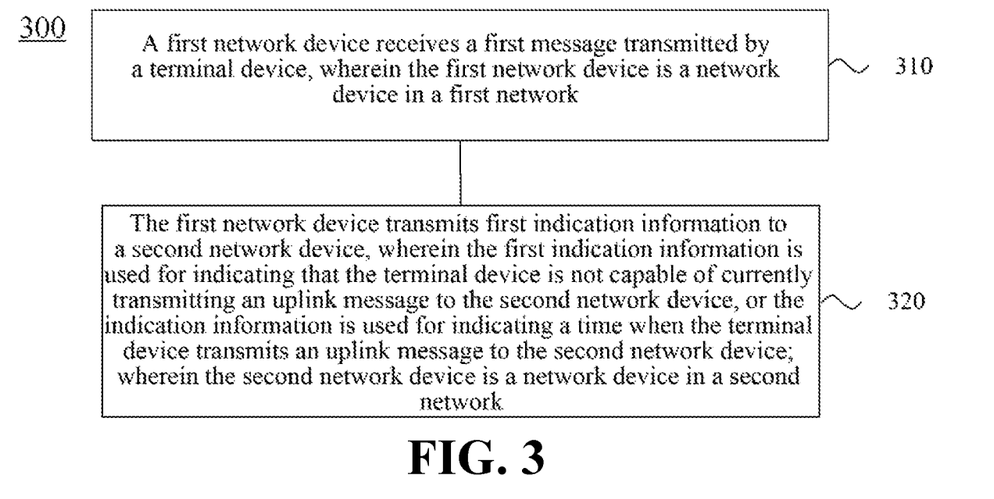
FIG. 3 is a schematic flow chart of another method for wireless communication of a terminal device in dual-registration according to an implementation of the present disclosure.

FIG. 3 is a schematic flow chart of a method 300 for wireless communication of a terminal device in dual-registration according to an implementation of the present disclosure. As shown in FIG. 3, the method 300 may be executed by a first network device. The first network device may be a core network device or an access network device as shown in FIG. 1, and the terminal device is simultaneously registered in a first network and a second network. The method 300 includes following contents.

In 310, the first network device receives a first message transmitted by the terminal device, wherein the first network device is a network device in the first network.

In at least one implementation, the first message includes at least one of uplink data, a paging response, and a location update request.

In at least one implementation, the terminal device does not support simultaneous uplink transmission in the first network and the second network.

In at least one implementation, the first network is a Long Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

In 320, the first network device transmits first indication information to a second network device, wherein the first indication information is used for indicating that the terminal device is not capable of currently transmitting an uplink message to the second network device, or the first indication information is used for indicating a time when the terminal device transmits an uplink message to the second network device; wherein the second network device is a network device in the second network.

In at least one implementation, the method further includes: the first network device transmits configuration information to the terminal device, wherein the configuration information indicates the terminal device to transmit an uplink message to the second network device within a first time period, and the second network device is a network device in the second network.

In at least one implementation, before the first network device transmits the configuration information to the terminal device, the method further includes: the first network device receives indication information transmitted by the terminal device, wherein the indication information is used for indicating that the terminal device needs to transmit at least one of uplink data, a paging response and a location update request to the second network device.

In at least one implementation, the method further includes: the first network device transmits second indication information to the terminal device, wherein the second indication information indicates the terminal device to transmit an uplink message to the second network device within a second time period.

In at least one implementation, the uplink message includes at least one of uplink data, a paging response and a location update request.

It should be understood that the acts in the method 300 for wireless communication of a terminal device in dual-registration may refer to the description of the corresponding acts in the wireless communication method 200 for wireless communication of a terminal device in dual-registration, and will not be described in detail herein for the sake of brevity.

Therefore, in the method for wireless communication of a terminal device in dual-registration according to the implementation of the present disclosure, a first network device receives a first message transmitted by the terminal device, and the first network device transmits indication information to a second network device to indicate a time when the terminal device transmits uplink information to the second network device, so that the terminal device can reasonably transmit uplink information to the first network device and the second network device.

Figure 4:
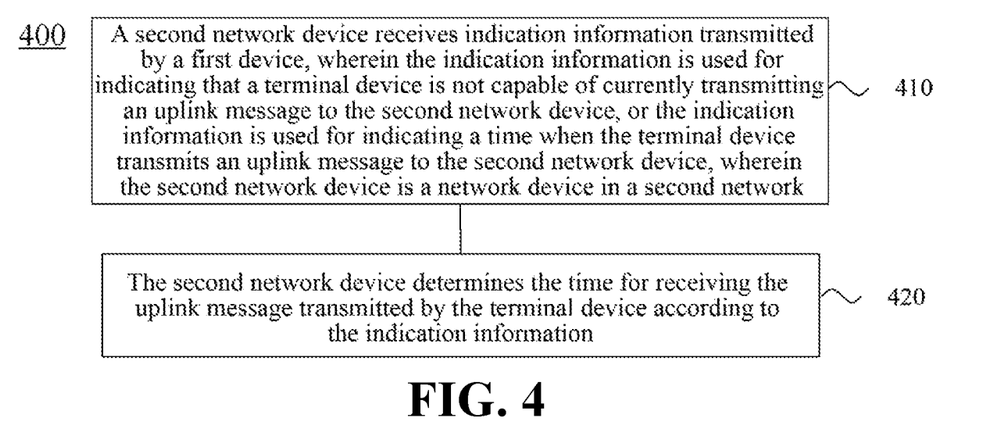
FIG. 4 is a schematic flow chart of yet another method for wireless communication of a terminal device in dual-registration according to an implementation of the present disclosure.

FIG. 4 is a schematic flow chart of a method 400 for wireless communication of a terminal device in dual-registration according to an implementation of the present disclosure. As shown in FIG. 4, the method 400 may be executed by a second network device. The second network device may be a core network device or an access network device as shown in FIG. 1, and the terminal device is simultaneously registered in both a first network and a second network. The method 400 includes following contents.

In 410, the second network device receives indication information transmitted by a first device, wherein the indication information is used for indicating that the terminal device is not capable of currently transmitting an uplink message to the second network device, or the indication information is used for indicating a time when the terminal device transmits an uplink message to the second network device, wherein the second network device is a network device in the second network.

In 420, the second network device determines the time for receiving the uplink message transmitted by the terminal device according to the indication message.

In at least one implementation, before the second network device receives the indication information transmitted by the first device, the method further includes: the second network device transmits a paging message to the terminal device.

In at least one implementation, the method further includes: the second network device receives the uplink message transmitted by the terminal device.

In at least one implementation, the uplink message includes at least one of uplink data, a paging response and a location update request.

In at least one implementation, the first device is the terminal device or a first network device, and the first network device is a network device in the first network.

In at least one implementation, the terminal device does not support simultaneous uplink transmission in the first network and the second network.

In at least one implementation, the first network is a Long-Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

It should be understood that the acts in the method 400 for wireless communication of a terminal device in dual-registration may refer to the description of the corresponding acts in method 200 for wireless communication of a terminal device in dual-registration, and will not be described in detail herein for the sake of brevity.

Therefore, in the method for wireless communication of a terminal device in dual-registration according to the implementation of the present disclosure, a second network device receives indication information transmitted by a first device and receives uplink information transmitted by the terminal device according to the indication information, so that the terminal device can reasonably transmit uplink information to the first network device and the second network device.

Figure 5:
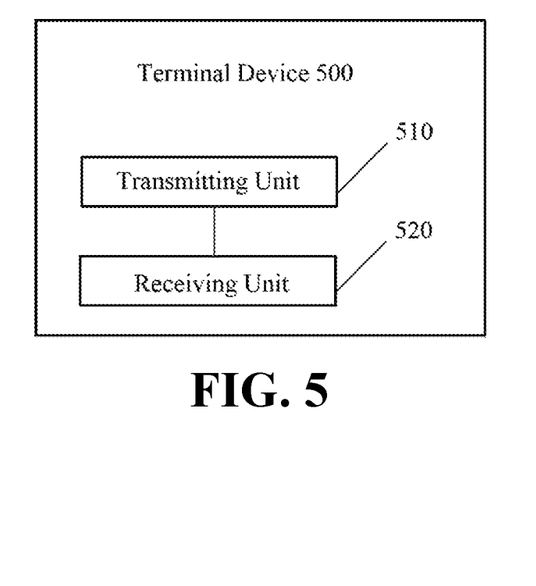
FIG. 5 is a schematic block diagram of a terminal device according to an implementation of the present disclosure.

FIG. 5 is a schematic block diagram of a terminal device 500 according to an implementation of the present disclosure. As shown in FIG. 5, the terminal device 500 may be simultaneously registered in a first network and a second network. The terminal device 500 includes: a transmitting unit 510 and a receiving unit 520.

The transmitting unit 510 is configured to transmit a first message to a first network device, wherein the first network device is a network device in the first network.

The receiving unit 520 is configured to receive configuration information transmitted by the first network device, wherein the configuration information indicates the terminal device to transmit an uplink message to a second network device within a first time period, and the second network device is a network device in the second network.

In at least one implementation, before the transmitting unit 510 transmits the first message to the first network device, or when the transmitting unit 510 transmits the first message to the first network device, the transmitting unit 510 is further configured to transmit first indication information to the second network device, wherein the first indication information is used for indicating that the terminal device is not capable of currently transmitting an uplink message to the second network device, or the first indication information is used for indicating a time when the terminal device is capable of transmitting an uplink message to the second network device.

In at least one implementation, the first indication information includes a second time period, and the first indication information is used for indicating that the terminal device is not capable of transmitting an uplink message to the second network device within the second time period.

In at least one implementation, before the receiving unit 520 receives the configuration information transmitted by the first network device, the transmitting unit 510 is further configured to transmit second indication information to the first network device, wherein the second indication information is used for indicating that the terminal device needs to transmit at least one of uplink data, a paging response, and a location update request to the second network device.

In at least one implementation, the first message includes at least one of uplink data, a paging response, and a location update request.

In at least one implementation, the transmitting unit 510 is further configured to transmit the uplink message to the second network device, wherein the uplink message includes at least one of uplink data, a paging response, and a location update request.

In at least one implementation, the terminal device 500 does not support simultaneous uplink transmission in the first network and the second network.

In at least one implementation, the first network is a Long Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

It should be understood that the above-mentioned and other operations and/or functions of various modules in the terminal device 500 according to the implementation of the present disclosure are respectively in order to realize the corresponding processes of the terminal device in the method 200 in FIG. 2, and are not repeated here for the sake of brevity.

Figure 6:
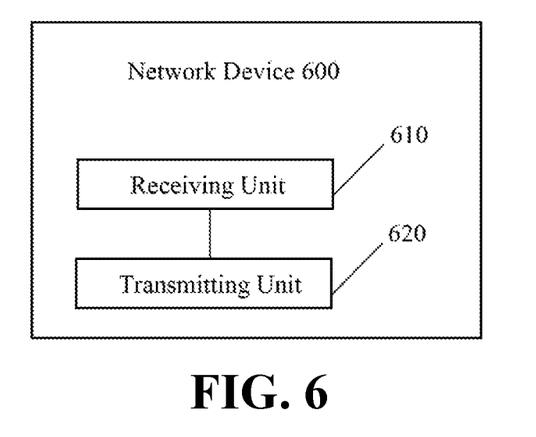
FIG. 6 is a schematic block diagram of a network device according to an implementation of the present disclosure.

FIG. 6 is a schematic block diagram of a network device 600 according to an implementation of the present disclosure. As shown in FIG. 6, the network device 600 communicates with a terminal device, and the terminal device is simultaneously registered in both a first network and a second network. The network device 600 includes: a receiving unit 610 and a transmitting unit 620.

The receiving unit 610 is configured to receive a first message transmitted by the terminal device, wherein the network device is a network device in the first network.

The transmitting unit 620 is configured to transmit first indication information to the second network device, wherein the first indication information is used for indicating that the terminal device is not capable of currently transmitting an uplink message to the second network device, or the first indication information is used for indicating a time when the terminal device transmits an uplink message to the second network device; wherein the second network device is a network device in the second network.

In at least one implementation, the transmitting unit 620 is further configured to transmit configuration information to the terminal device, wherein the configuration information indicates the terminal device to transmit an uplink message to the second network device within a first time period, and the second network device is a network device in the second network.

In at least one implementation, before the transmitting unit 620 transmits the configuration information to the terminal device, the receiving unit 610 is further configured to receive indication information transmitted by the terminal device, wherein the indication information is used for indicating that the terminal device needs to transmit at least one of uplink data, a paging response, and a location update request to the second network device.

In at least one implementation, the transmitting unit 620 is further configured to transmit second indication information to the terminal device, wherein the second indication information indicates the terminal device to transmit an uplink message to the second network device within a second time period.

In at least one implementation, the first message includes at least one of uplink data, a paging response, and a location update request.

In at least one implementation, the uplink message includes at least one of uplink data, a paging response, and a location update request.

In at least one implementation, the terminal device does not support simultaneous uplink transmission in the first network and the second network.

In at least one implementation, the first network is a Long Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

It should be understood that the above-mentioned and other operations and/or functions of various modules in the network device 600 according to the implementation of the present disclosure are respectively in order to realize the corresponding processes of the first network device in the method 300 in FIG. 3, and are not repeated here for the sake of brevity.

Figure 7:
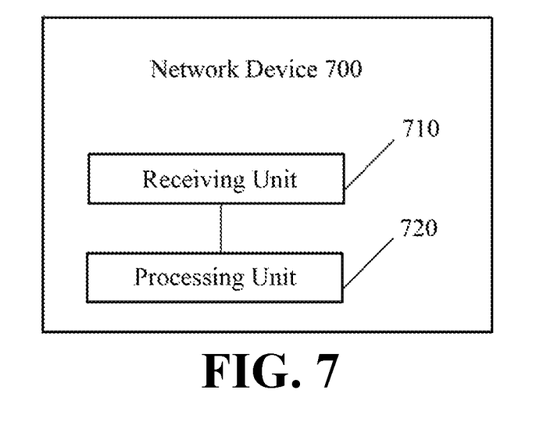
FIG. 7 is a schematic block diagram of another network device according to an implementation of the present disclosure.

FIG. 7 is a schematic block diagram of a network device 700 according to an implementation of the present disclosure. As shown in FIG. 7, the network device 700 communicates with a terminal device, and the terminal device is simultaneously registered in both a first network and a second network. The network device 700 includes: a receiving unit 710 and a processing unit 720.

The receiving unit 710 is configured to receive indication information transmitted by a first device, wherein the indication information is used for indicating that the terminal device is not capable of currently transmitting an uplink message to the second network device, or the indication information is used for indicating a time when the terminal device transmits an uplink message to the network device, wherein the network device is a network device in the second network.

The processing unit 720 is configured to determine the time for receiving the uplink message transmitted by the terminal device according to the indication message.

In at least one implementation, the network device 700 further includes: a transmitting unit 730, before the receiving unit 710 receives the indication information transmitted by the first device, the transmitting unit 730 is configured to transmit a paging message to the terminal device.

In at least one implementation, the receiving unit 710 is further configured to receive the uplink message transmitted by the terminal device.

In at least one implementation, the uplink message includes at least one of uplink data, a paging response, and a location update request.

In at least one implementation, the first device is the terminal device or the first network device, and the first network device is a network device in the first network.

In at least one implementation, the terminal device does not support simultaneous uplink transmission in the first network and the second network.

In at least one implementation, the first network is a Long Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

It should be understood that the above-mentioned and other operations and/or functions of various modules in the network device 700 according to the implementation of the present disclosure are respectively in order to realize the corresponding processes of the second network device in the method 400 in FIG. 4, and are not repeated here for the sake of brevity.

Figure 8:
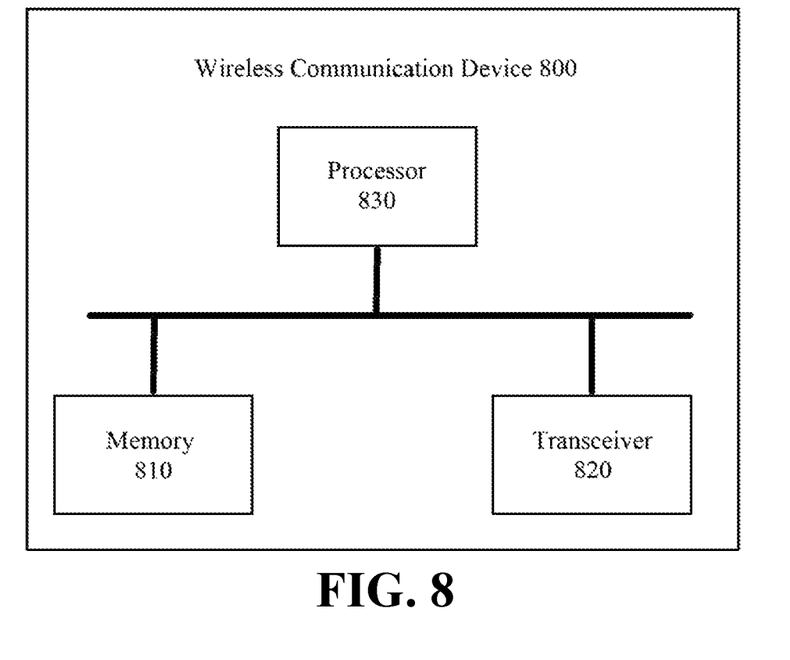
FIG. 8 shows a schematic block diagram of a wireless communication device according to an implementation of the present disclosure.

FIG. 8 shows a schematic block diagram of a wireless communication device according to an implementation of the present disclosure. The device 800 includes: a memory 810, a transceiver 820, and a processor 830.

The memory 810 is configured to store a program including codes.

The transceiver 820 is configured to communicate with other devices.

The processor 830 is configured to execute the codes of the program in the memory 810.

In at least one implementation, the transceiver 820 is configured to execute specific transmitting and receiving of signals under the driving of the processor 830.

In at least one implementation, when the codes are executed, the processor 830 may implement various operations executed by the terminal device in the method 200 in FIG. 2, which will not be repeated here for brevity. In this case, the device 800 may be a terminal device (e.g., a cell phone).

In at least one implementation, when the codes are executed, the processor 830 may implement various operations executed by the first network device in the method 300 in FIG. 3 or the second network device in the method 400 in FIG. 4, and will not be described in detail herein for the sake of brevity. In this case, the device 800 may be an access network device (e.g., gNB) or a core network device (e.g., AMF).

It should be understood that in the implementation of the present disclosure, the processor 830 may be a Central Processing Unit (CPU), or the processor 830 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor, or the processor may be any conventional processor or the like.

The memory 810 may include a read-only memory and a random access memory, and provide instructions and data to the processor 830. A portion of memory 810 may include a non-volatile random access memory. For example, the memory 810 may also store type information of the device.

The transceiver 820 may be configured to implement signal transmission and reception functions, such as frequency modulation and demodulation functions, or up-conversion and down-conversion functions.

In the implementation process, at least one act of the method may be completed by an integrated logic circuit of hardware in the processor 830, or the integrated logic circuit may complete the at least one act under the driving of instructions in a form of software. Therefore, the wireless communication device 800 may be a chip or chipset. The acts of the method disclosed in connection with the implementation of the present disclosure may be directly embodied to be completed by an execution of a hardware processor or by a combination of hardware and software modules in a processor. The software modules may be located in a storage medium commonly used in the art, such as a random access memory, flash memory, read-only memory, programmable read-only memory or electrically erasable programmable memory, or register. The storage medium is located in the memory, and the processor 830 reads the information in the memory and accomplishes the acts of the method with its hardware. In order to avoid repetition, it will not be described in detail here.

Figure 9:
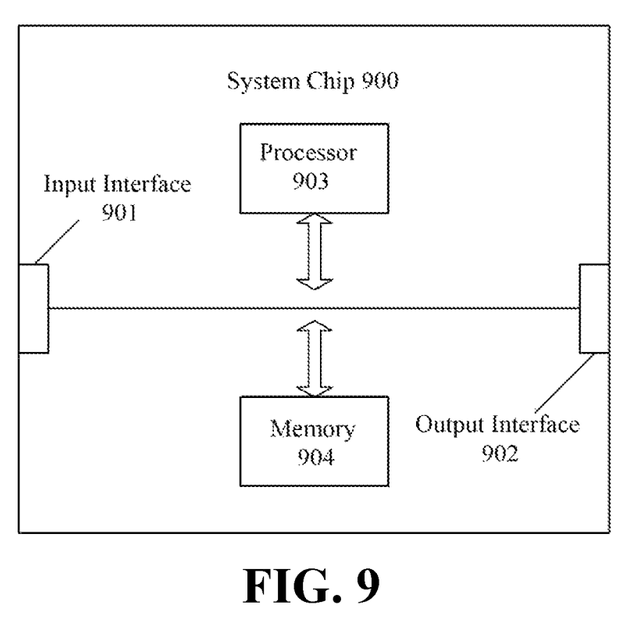
FIG. 9 is a schematic structural diagram of a system chip according to an implementation of the present disclosure.

FIG. 9 is a schematic block diagram of a system chip 900 according to an implementation of the present disclosure. The system chip 900 of FIG. 9 includes an input interface 901, an output interface 902, a processor 903 and a memory 904, and the processor 903 and the memory 904 may be connected through internal communication connection lines, and the processor 903 is used for executing codes in the memory 904.

In at least one implementation, when the codes are executed, the processor 903 implements the method executed by the terminal device in the method implementation. For the sake of conciseness, it will not be repeated here.

In at least one implementation, when the codes are executed, the processor 903 implements the method executed by the first network device or the second network device in the method implementation. For the sake of conciseness, it will not be repeated here.

The implementations may be implemented in whole or in part by software, hardware, firmware, or any combination thereof. When the functions described in the implementations of the present disclosure are implemented through software, these functions may be implemented in whole or in parts in the form of a computer program product. The computer program product includes one or more computer program instructions. When the one or more computer program instructions are loaded and executed on a computer, the processes or functions described in the implementations of the present disclosure are generated in whole or in part. The computer may be a general purpose computer, a special purpose computer, a computer network, or other programmable apparatus. The computer instructions may be stored in a computer-readable storage medium or transmitted from one computer-readable storage medium to another, for example, the computer program instructions may be transmitted from a website site, computer, server or data center to another website site, computer, server or data center in a wired mode (e.g., coaxial cable, optical fiber, digital subscriber line (DSL)) or in a wireless way (e.g., infrared, wireless, microwave and the like) manner. The computer-readable storage medium may be any available medium that a computer may access or a data storage device such as a server, a data center, or the like that integrates one or more available medium. The available medium may be a magnetic medium (e.g., floppy disk, hard disk, magnetic tape), an optical medium (e.g., DVD), or a semiconductor medium (e.g., Solid State Disk (SSD)) or the like.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

Those skilled in the art may clearly understand that for convenience and conciseness of description, the specific working processes of the system, apparatus and unit described above may refer to the corresponding processes in the aforementioned method implementations and will not be described here.

What are described above are merely specific implementations of the present disclosure, but the protection scope of the present disclosure is not limited thereto. Any change or substation that may be easily conceived by a person skilled in the art within the technical scope disclosed by the present disclosure shall be included within the protection scope of the present disclosure. Therefore, the scope of protection of the present disclosure shall be subject to that of the claims.

What is claimed is:

1. A method for wireless communication of a terminal device in dual-registration, wherein the terminal device performs the registration process for both a first network and a second network simultaneously and is currently dual registered with both the first network and the second network; and the method comprises:
  transmitting, by the terminal device, first indication information to the second network device;
  transmitting, by the terminal device, a first message to a first network device, wherein the first network device is a network device in the first network; and
  receiving, by the terminal device, configuration information transmitted and configured by the first network device, wherein the configuration information is used for indicating the terminal device to transmit an uplink message to a second network device within a first time period, and the second network device is a network device in the second network;
  wherein the first indication information comprises a second time period, and the first indication information is used for indicating that the terminal device is prohibited from transmitting an uplink message to the second network device with the second time period,
  wherein the first message comprises uplink data, a paging response, and a location update request.

2. The method according to claim 1, wherein before the terminal device receives the configuration information transmitted by the first network device, the method further comprises:
  transmitting, by the terminal device, second indication information to the first network device, wherein the second indication information is used for indicating that the terminal device needs to transmit at least one of uplink data, a paging response, and a location update request to the second network device.

3. The method according to claim 1, wherein the method further comprises:
  transmitting, by the terminal device, the uplink message to the second network device, wherein the uplink message comprises at least one of uplink data, a paging response, and a location update request.

4. The method according to claim 1, wherein the terminal device does not support simultaneous uplink transmission in the first network and the second network.

5. The method according to claim 1, wherein the first network is a Long Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

6. A network device, wherein the network device communicates with a terminal device, wherein the terminal device performs the registration process for both a first network and a second network simultaneously and is currently dual registered with both the first network and the second network; and the network device comprises:
  a receiving unit configured to receive a first message transmitted by the terminal device wherein the first network device is a network device in the first network; and
  a transmitting unit configured to transmit first indication information to a second network device, wherein the second network device is a network device in the second network,
  wherein the first indication information comprises a second time period, and the first indication information is used for indicating that the terminal device is prohibited from transmitting an uplink message to the second network device within the second time period,
  wherein the transmitting unit is further configured to transmit configuration information configured by the first network device to the terminal device, wherein the configuration information indicates the terminal device to transmit an uplink message to the second network device within a first time period, and
  wherein the first message comprises uplink data, a paging response, and a location update request.

7. The network device according to claim 6, wherein before the transmitting unit transmits the configuration information to the terminal device, the receiving unit is further configured to receive second indication information transmitted by the terminal device, wherein the second indication information is used for indicating that the terminal device needs to transmit at least one of uplink data, a paging response, and a location update request to the second network device.

8. A terminal device, wherein the terminal device performs the registration process for both a first network and a second network simultaneously and is currently dual registered with both the first network and the second network; and the terminal device comprises: a memory, a transceiver, and a processor;
  the memory is configured to store a program including codes;
  the transceiver is configured to communicate with other devices; and
  the processor is configured to execute the codes of the program in the memory;
  wherein the transceiver is configured to:
    transmit first indication information to the second network device;
    transmit a first message to a first network device, wherein the first network device is a network device in the first network; and
    receive configuration information transmitted and configured by the first network device, wherein the configuration information indicates the terminal device to transmit an uplink message to a second network device within a first time period, and the second network device is a network device in the second network;
  wherein the first indication information comprises a second time period, and the first indication information is used for indicating that the terminal device is prohibited from transmitting an uplink message to the second network device within the second time period, and wherein the first message comprises uplink data, a paging response, and a location update request.

9. The terminal device according to claim 8, wherein before the transceiver receives the configuration information transmitted by the first network device, the transceiver is further configured to transmit second indication information to the first network device, wherein the second indication information is used for indicating that the terminal device needs to transmit at least one of uplink data, a paging response, and a location update request to the second network device.

10. The terminal device according to claim 8, wherein the transceiver is further configured to transmitting the uplink message to the second network device, wherein the uplink message comprises at least one of uplink data, a paging response, and a location update request.

11. The terminal device according to claim 8, wherein the terminal device does not support simultaneous uplink transmission in the first network and the second network.

12. The network device according to claim 6, wherein the terminal device does not support simultaneous uplink transmission in the first network and the second network.

13. The network device according to claim 6, wherein the first network is a Long Term Evolution (LTE) network, the second network is a New Radio (NR) network; or the first network is an NR Network, the second network is an LTE network; or the first network is an NR network, the second network is an NR network; or the first network is an LTE network, the second network is an LTE network.

\* \* \* \* \*